（12）United States Patent
Shimanouchi et al.

(10) Patent No.: US 7,307,827 B2
(45) Date of Patent: Dec. 11, 2007

(54) VARIABLE CAPACITOR AND METHOD OF MANUFACTURING VARIABLE CAPACITOR

(75) Inventors: Takeaki Shimanouchi, Kawasaki (JP); Masahiko Imai, Kawasaki (JP); Tadashi Nakatani, Kawasaki (JP); Anh Tuan Nguyen, Kawasaki (JP); Satoshi Ueda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/104,453

(22) Filed: Apr. 13, 2005

(65) Prior Publication Data

US 2006/0171097 A1 Aug. 3, 2006

(30) Foreign Application Priority Data

Jan. 31, 2005 (JP) .............................. 2005-024153

(51) Int. Cl.
*H01G 5/01* (2006.01)
*H01G 7/00* (2006.01)

(52) U.S. Cl. ....................................... 361/278; 361/280

(58) Field of Classification Search ........ 361/277–282, 361/283.1, 283.2, 283.3, 283.4, 286–287, 361/290–291, 303–305
See application file for complete search history.

(56) References Cited

U.S. PATENT DOCUMENTS 1,729,704 A * 10/1929 Brokaw ..................... 361/290

| | | | |
|---|---|---|---|
| 2,179,068 A | 11/1939 | Sprague et al. | |
| 6,625,004 B1 | 9/2003 | Musolf et al. | |
| 2003/0151879 A1 | 8/2003 | Yang et al. | |
| 2004/0246654 A1* | 12/2004 | Williams et al. ............ | 361/278 |

FOREIGN PATENT DOCUMENTS

| CH | 598689 | * | 11/1977 |
|---|---|---|---|
| DE | 25 133 785 A1 | | 10/1975 |
| JP | 08181038 A | * | 7/1996 |
| JP | 9-162074 | | 6/1997 |
| JP | 2003-188049 | | 7/2003 |
| KR | 2002-0085990 | | 11/2002 |
| WO | 01/45 127 A1 | | 6/2001 |
| WO | WO 03/106326 A2 | | 12/2003 |

* cited by examiner

*Primary Examiner*—Eric Thomas
(74) *Attorney, Agent, or Firm*—Arent Fox LLP

(57) ABSTRACT

The first movable electrode is flat, but the second movable electrode is deformed into a convex shape. A dielectric layer is placed on the facing surface of the second movable electrode. By adjusting a voltage to be applied between the first movable electrode and the second movable electrode, an arbitrary distance is secured between the two electrodes by the electrostatic attractive force generated between the two electrodes, and a desired electrostatic capacitance is obtained. When the distance between the two electrodes is shortened, first, at the center, a part of the first movable electrode and a part of the second movable electrode come into contact with each other with the dielectric layer between them. Then, the first movable electrode and the dielectric layer (second movable electrode) come into contact with each other successively from the contact part towards the periphery side, and the contact area gradually increases.

13 Claims, 14 Drawing Sheets

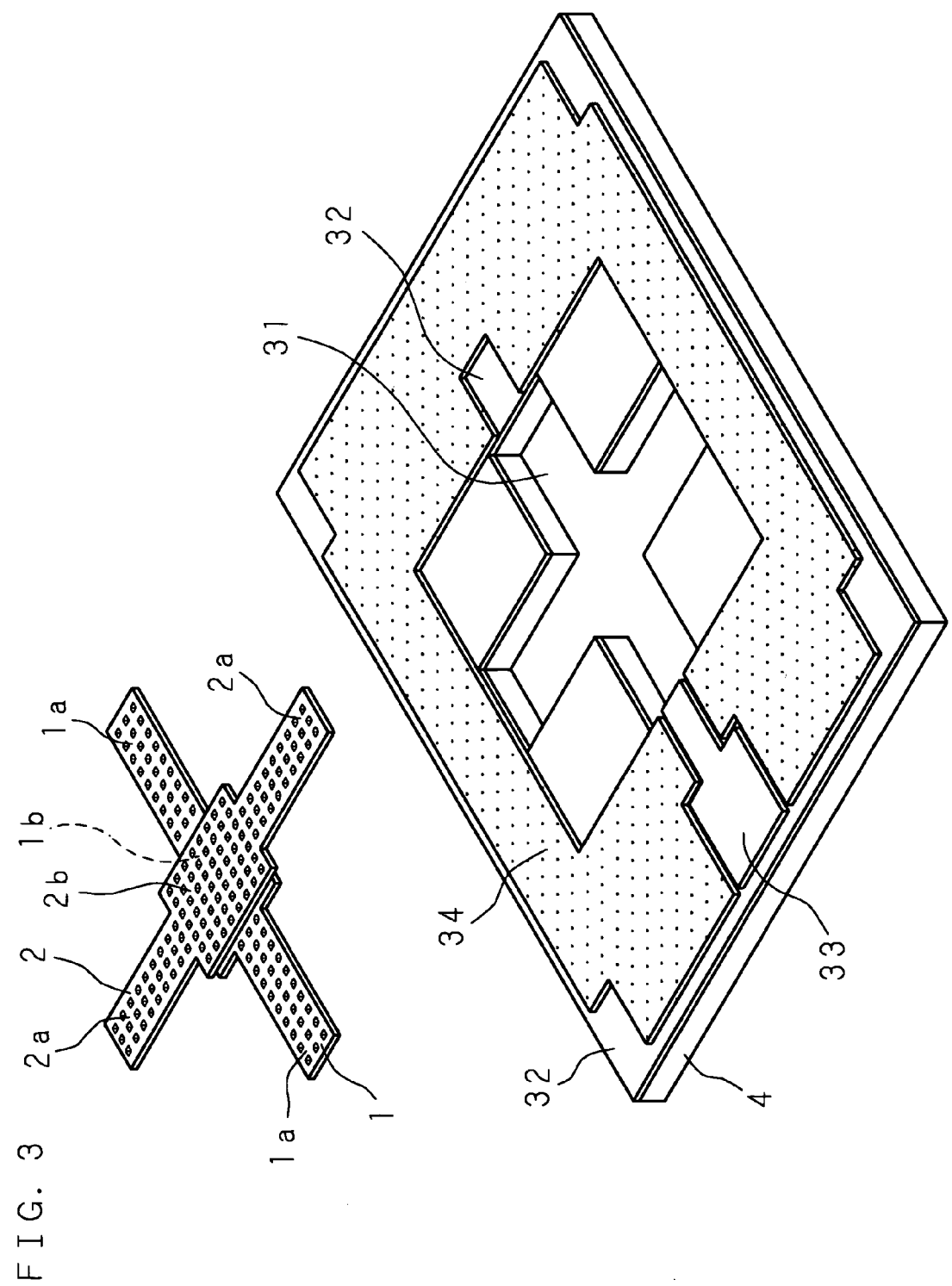

VARIABLE CAPACITOR AND METHOD OF MANUFACTURING VARIABLE CAPACITOR

CROSS-REFERENCE TO RELATED APPLICATION

This non-provisional application claims priority under 35 U.S.C. §119(a) on Patent Application No. 2005-24153 filed in Japan on Jan. 31, 2005, the entire contents of which are hereby incorporated by reference.

BACKGROUND OF THE INVENTION

The present invention relates to a variable capacitor and a manufacturing method thereof, and more particularly relates to a variable capacitor using MEMS (Micro Electro Mechanical System) techniques and a manufacturing method thereof.

A variable capacitor is an important component of electric circuits including a variable frequency oscillator, a tuned amplifier, a phase shifter, an impedance matching circuit, etc., and in recent years, an increasing number of portable apparatuses incorporate a variable capacitor. Compared to varactor diodes which are mainly used nowadays, a variable capacitor manufactured using MEMS techniques has the advantage that it can increase the Q value with a small loss, and therefore there is an urgent need for the development of the variable capacitor (see, for example, Japanese Patent Applications Laid-Open No. 2003-188049 and No. 09-162074).

In general, a variable capacitor comprises two facing electrodes, one or both of which is a movable electrode, and changes the capacitance by changing the distance between the two facing electrodes by driving the movable electrode with an actuator.

FIG. 1 is a structural diagram of a conventional typical variable capacitor. A fixed electrode 41 is mounted on a substrate 44, and a movable electrode 42 is resiliently supported by a substrate 44 to face the fixed electrode 41. In FIG. 1, a spring 51 is illustrated functionally to show this resilient support. By adjusting a voltage to be applied between the fixed electrode 41 and movable electrode 42, the balance between the electrostatic attractive force generated between the two electrodes 41, 42 and the strength of the spring 51 is controlled, and an arbitrary distance d is secured between the two electrodes 41 and 42. Further, by changing the distance d, a desired electrostatic capacitance is obtained.

The conventional variable capacitor shown in FIG. 1 has the following problems. When the distance d between the two electrodes 41 and 42 is decreased to ⅔ of the initial value or less, a pull-in phenomenon occurs and the movable electrode 42 is suddenly attracted and comes into contact with the fixed electrode 41, and consequently a short-circuit occurs between the two electrodes 41 and 42. For this reason, in a variable capacitor having such a structure, since the distance d between the two electrodes 41 and 42 can be decreased up to ⅔ of the initial value, the capacitance can be changed only up to 1.5 times the initial value.

BRIEF SUMMARY OF THE INVENTION

The present invention has been made with the aim of solving the above problems, and it is an object of the present invention to provide a variable capacitor capable of obtaining a large capacitance and a large capacitance change and allowing a fine adjustment of the capacitance even with a small-size structure, and to provide a manufacturing method thereof.

A variable capacitor of a first aspect of the invention is a variable capacitor whose capacitance is changed by changing the distance between two facing electrodes, which comprises a dielectric layer between the two electrodes and is constructed so that when the distance between the two electrodes is shortened, parts of the two electrodes come into contact with each other with the dielectric layer therebetween, and the contact area increases from the contact part as the origin. In the variable capacitor of the first aspect, when the distance between the two facing electrodes is shortened, first, parts of the two electrodes come into contact with each other with the dielectric layer therebetween, and then the contact area gradually increases from the contact part as the origin. In this structure, it is possible to obtain a large capacitance and a large capacitance change without being influenced by a pull-in phenomenon.

A variable capacitor of a second aspect of the invention is a variable capacitor whose capacitance is changed by changing the distance between two facing electrodes, and comprises a dielectric layer between the two electrodes, wherein one or both of the two electrodes has a convex portion and/or a concave portion. In the variable capacitor of the second aspect, since at least one of the two electrodes has a convex portion and/or a concave portion, it is possible to easily obtain a structure in which parts of the two electrodes come into contact with each other with the dielectric layer therebetween when shortening the distance between the two electrodes.

A variable capacitor of a third aspect of the invention is a variable capacitor whose capacitance is changed by changing the distance between two facing electrodes, and comprises a dielectric layer between the two electrodes, wherein one electrode is tilted with respect to the other electrode. In the variable capacitor of the third aspect, since one of the electrodes is tilted with respect to the other electrode, it is possible to easily obtain a structure in which parts of the two electrodes come into contact with each other with the dielectric layer therebetween when shortening the distance between the two electrodes.

According to a variable capacitor of a fourth aspect of the invention, in any one of the first through third aspects, the dielectric layer is placed on the facing surface of one or both of the two electrodes. In the variable capacitor of the fourth aspect, since the dielectric layer to be interposed between the two facing electrodes is placed at least on the facing surface of one of the electrodes, the dielectric layer for preventing a short-circuit between the electrodes can be provided stably.

According to a variable capacitor of a fifth aspect of the invention, in any one of the first through fourth aspects, a hydrophobic treatment is applied to the facing surfaces of the electrodes and/or the facing surface of the dielectric layer. In the variable capacitor of the fifth aspect, since the hydrophobic treatment is applied to the facing surfaces of the two facing electrodes and/or the facing surface of the dielectric layer, occurrence of a sticking phenomenon between the two electrodes is reduced.

According to a variable capacitor of a sixth aspect of the invention, in the second aspect, the convex portion and/or the concave portion are used as springs when changing the distance between the two electrodes. In the variable capacitor of the sixth aspect, since the convex portion and/or the concave portion are used as springs when changing the distance between the two facing electrodes, it is possible to easily increase the contact from the convex portion and/or the concave portion as the origin.

According to a variable capacitor of a seventh aspect of the invention, in the second aspect, the convex portion and/or the concave portion are formed using the difference in internal stress or thermal expansion coefficient between materials. In the variable capacitor of the seventh aspect, since the convex portion and/or the concave portion of the two facing electrodes are formed using the difference in the internal stress or thermal expansion coefficient between the materials, the convex portion and/or the concave portion are easily formed.

A method of manufacturing a variable capacitor of an eighth aspect of the invention is a method of manufacturing a variable capacitor whose capacitance is changed by changing the distance between two facing electrodes, and comprises the step of stacking an electrode film to be the electrode and a dielectric film having a different stress or thermal expansion coefficient from the electrode film. In the method of manufacturing a variable capacitor of the eighth aspect, for example, by stacking a dielectric film having a tensile stress on an electrode film having a compressive stress, a structure with a concave center is easily produced. Since the electrode film and dielectric film having opposite stress directions are stacked, an electrode with a convex or concave center can be easily produced.

A method of manufacturing a variable capacitor of a ninth aspect of the invention is a method of manufacturing a variable capacitor whose capacitance is changed by changing the distance between two facing electrodes, and comprises the steps of forming a sacrifice layer on a substrate; forming a convex resist pattern on the sacrifice layer; forming an electrode film to be the electrode on the sacrifice layer and the resist pattern; and removing the sacrifice layer and the resist pattern. In the method of manufacturing a variable capacitor of the ninth aspect, a sacrifice layer is formed on a substrate, a convex resist pattern is formed on the sacrifice layer, an electrode film is formed to cover the sacrifice layer and the resist pattern, and then the sacrifice layer and the resist pattern are removed. Accordingly, an electrode having a partly convex shape is easily produced.

The above and further objects and features of the invention will more fully be apparent from the following detailed description with accompanying drawings.

BRIEF DESCRIPTION OF THE SEVERAL VIEWS OF THE DRAWINGS

FIG. 3 is an exploded perspective view of a variable capacitor of the present invention;

DETAILED DESCRIPTION OF THE INVENTION

Figure 1:
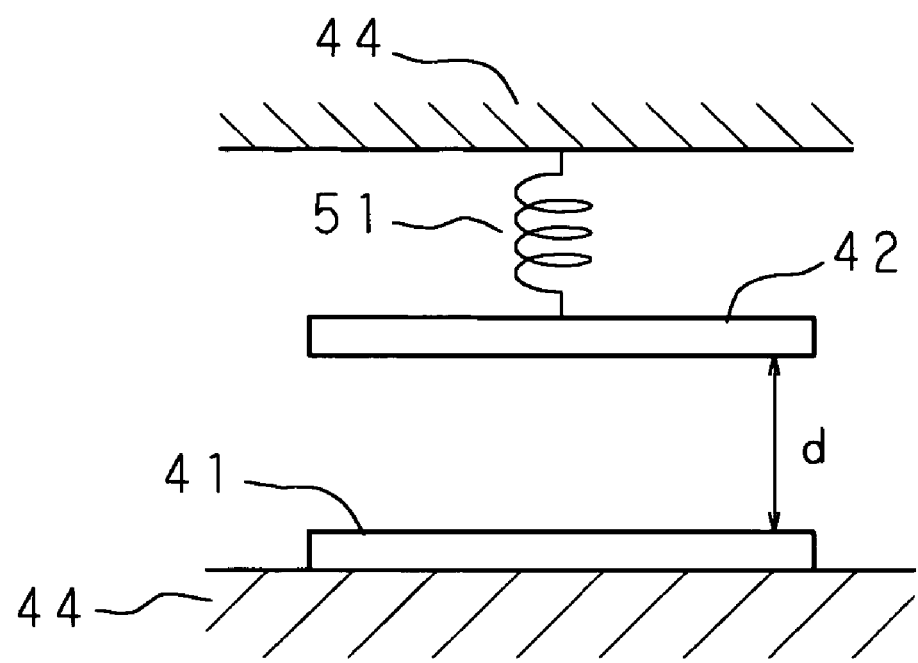
FIG. 1 is a structural diagram of a conventional typical variable capacitor.
Figure 2:
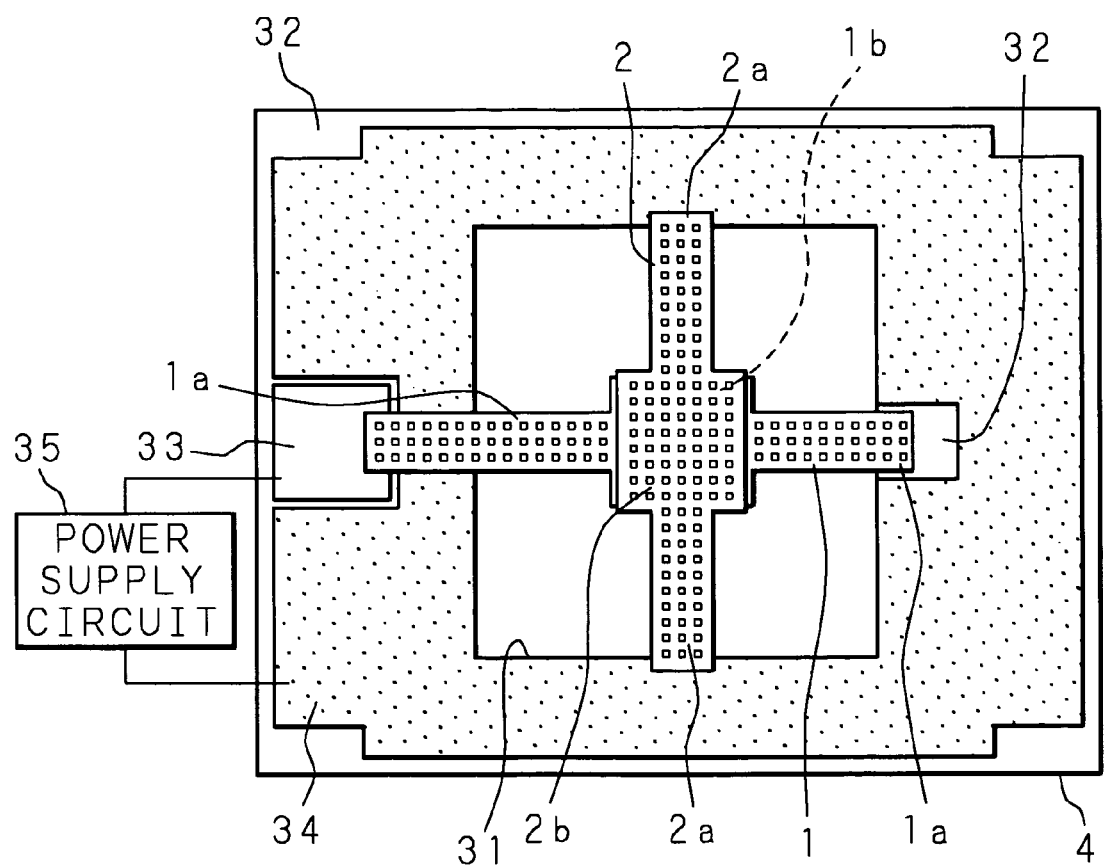
FIG. 2 is a plan view of a variable capacitor of the present invention.

The following description will specifically explain the present invention with reference to the drawings. FIG. 2 is a plan view of a variable capacitor of the present invention, and FIG. 3 is an exploded perspective view of the same variable capacitor.

In FIGS. 2 and 3, the reference numeral 4 represents a substrate formed of silicon, glass, compound semiconductor, etc. A cross-shaped opening 31 is formed in the center of the substrate 4, and an insulating layer 32 is placed on the upper surface of the substrate 4. In FIGS. 2 and 3, the reference numerals 1 and 2 represent a lower movable electrode and an upper movable electrode, respectively, both of which are made of aluminum, for example.

The movable electrode 1 has rail sections 1a, 1a on both sides, and a capacitor section 1b in the center, and an end of one rail section 1a is connected to a signal pad 33, and an end of the other rail section 1a is connected onto the insulating layer 32 and electrically separated from a ground electrode 34. The movable electrode 1 is supported by the substrate 4 at these ends, and the other part of the movable electrode 1 except for these ends is positioned over the opening 31. On the other hand, the movable electrode 2 has rail sections 2a, 2a on both sides, and a capacitor section 2b in the center, and ends of the two rail sections 2a are both connected to the ground electrode 34. The movable electrode 2 is supported by the substrate 4 at these ends, and the other part of the movable electrode 2 except for these ends is positioned over the opening 31.

These movable electrodes 1 and 2 are arranged in a cross shape according to the opening 31 of the substrate 4, and the capacitor section 1b of the movable electrode 1 and the capacitor section 2b of the movable electrode 2 face each other with an air layer therebetween. These facing capacitor sections 1b and 2b function as a capacitor. Note that the movable electrode 1 and movable electrode 2 which are electrically separated from each other can be used in a state being floated from the ground, but in order to reduce the floating capacitance, the movable electrode 2 is connected to the ground electrode 34.

A power supply circuit 35 is provided between the signal pad 33 and the ground electrode 34 so as to apply a voltage between the signal pad 33 (movable electrode 1) and the ground electrode 34 (movable electrode 2). By applying a voltage between the movable electrode 1 and movable electrode 2 by the power supply circuit 35, the distance between the two electrodes 1 and 2 is controlled by the electrostatic attractive force generated between the two electrodes 1 and 2. Further, by adjusting the distance between the two electrodes 1 and 2, a desired electrostatic capacitance is obtained.

(First Embodiment)

Figure 4A:
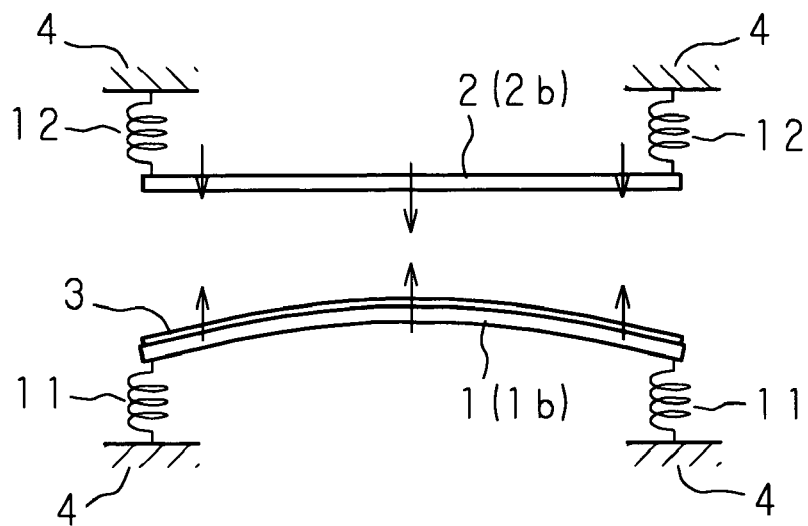
FIGS. 4A–4C are structural diagrams of the essential sections of a variable capacitor according to the first embodiment.
Figure 4B:
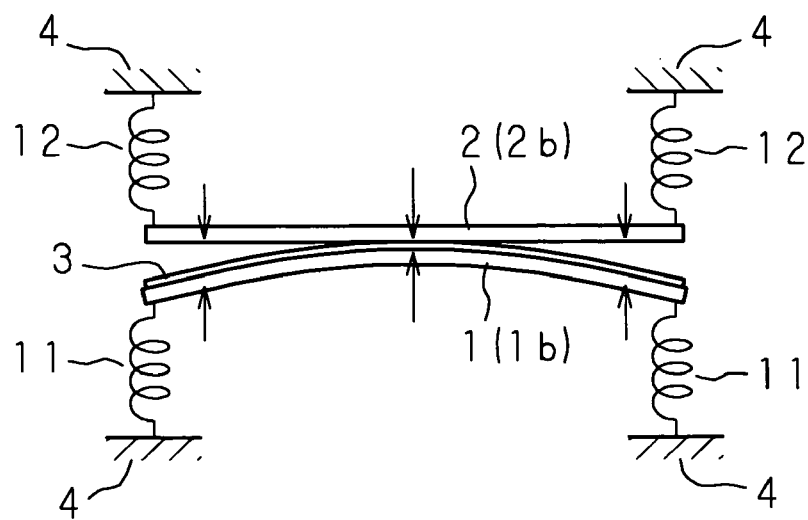
Figure 4C:
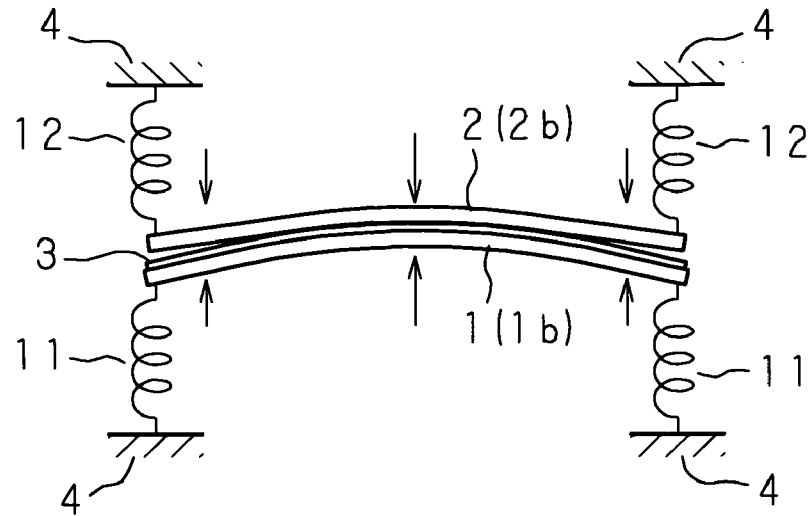

FIGS. 4A–4C are structural diagrams of the essential sections of a variable capacitor according to the first embodiment. As shown in FIG. 4A, the movable electrode 1 and movable electrode 2 are resiliently supported by the substrates 4 so that their capacitor sections 1b and 2b face each other. The upper movable electrode 2 is flat, but the lower movable electrode 1 is deformed into a convex shape. On the facing surface of the movable electrode 1 on the side facing the movable electrode 2, a dielectric layer 3 made of alumina, for example, is placed. Note that the rail sections 1a, 1a of the movable electrode 1 and the rail sections 2a, 2a of the movable electrode 2 function as spring members, and in FIGS. 4A–4C, springs 11 and 12 are functionally illustrated to show this resilient support.

By adjusting a voltage to be applied between the movable electrode 1 and the movable electrode 2, an arbitrary distance is secured between the two electrodes 1 and 2 by the electrostatic attractive force generated between the two electrodes 1 and 2, and a desired electrostatic capacitance is obtained by changing the distance.

When the distance between the movable electrode 1 and the movable electrode 2 is shortened by applying a voltage between the two electrodes 1 and 2, since the movable electrode 1 has a convex shape, first, at the center, a part of the movable electrode 1 and a part of the movable electrode 2 come into contact with each other with the dielectric layer 3 therebetween (FIG. 4B). Then, the movable electrode 2 and the dielectric layer 3 (movable electrode 1) come into contact with each other successively from the contact part towards the periphery side, and the contact area gradually increases (FIG. 4C).

The spring constant of the springs 11 and 12 supporting the movable electrode 1 or the movable electrode 2 is set smaller than the spring constant of the movable electrode 1 (capacitor section 1b) or the movable electrode 2 (capacitor section 2b). Therefore, when a voltage is applied between the movable electrode 1 and the movable electrode 2, as shown in FIG. 4B, it is possible to obtain a capacitance change until the movable electrode 1 and the movable electrode 2 come into contact with each other because of the balance between the spring constant of the springs 11 and 12 supporting the respective electrodes 1 and 2 and the electrostatic attractive force between the two electrodes 1 and 2. Further, when a voltage is applied between the two electrodes 1 and 2, as shown in FIG. 4C, it is possible to obtain a capacitance change because of the balance between the spring constant of the movable electrode 1 or movable electrode 2 and the electrostatic attractive force between the two electrodes 1 and 2.

An electrostatic attractive force F acting to decrease the interval between the facing parallel plates is expressed by equation (1) below. The smaller the distance d between the electrodes, the greater the electrostatic attractive force F generated, and therefore if the distance d between the electrodes is small, a smaller applied voltage is necessary to obtain the electrostatic attractive force F of the same magnitude.

$$F = S\epsilon_0\epsilon_r V^2 / 2d^2 \tag{1}$$

where S: the area of electrodes, d: the distance between electrodes, $\epsilon_0$: the permittivity in vacuum, $\epsilon_r$: the relative permittivity between electrodes, V: the applied voltage.

The distance between the two electrodes 1 and 2 shown in FIG. 4B or FIG. 4C is 0 at the part where the two electrodes 1 and 2 are in contact with each other, and the distance is very close to 0 in the periphery thereof, and thus in these parts, it is possible to cause the two electrodes 1 and 2 to come into contact with each other by a small applied voltage. Since the electrostatic capacitance C is expressed by equation (2) below, the smaller the distance d between the electrodes, the greater the electrostatic capacitance C, and a change in the distance between the electrodes in the area where the distance d between the electrodes is small appears as a large capacitance change.

$$C = \epsilon_0 \epsilon_r S / d \tag{2}$$

For the above-described reason, a variable capacitor of the present invention can realize both of a large electrostatic capacitance and a large electrostatic capacitance change by a small driving voltage. Moreover, it is possible to decrease the size compared to a conventional variable capacitor when ensuring the same electrostatic capacitance.

Since the movable electrodes 1 and 2 constituting the variable capacitor have spring properties by themselves, occurrence of a sticking phenomenon between the two electrodes is reduced. Regarding the sticking phenomenon, if a hydrophobic treatment is applied to the surface by applying a hydrophobic agent such as dimethyl dichlorosilane and octadecyl trichlorosilane to the contact part, the influence of moisture in the ambient atmosphere of the capacitor sections 1b and 2b is blocked, and therefore it is possible to further reduce the sticking phenomenon. A hydrophobic treatment may be applied to the surface by the use of plasma of from chlorofluorocarbon-system gas.

(Second Embodiment)

Figure 5:
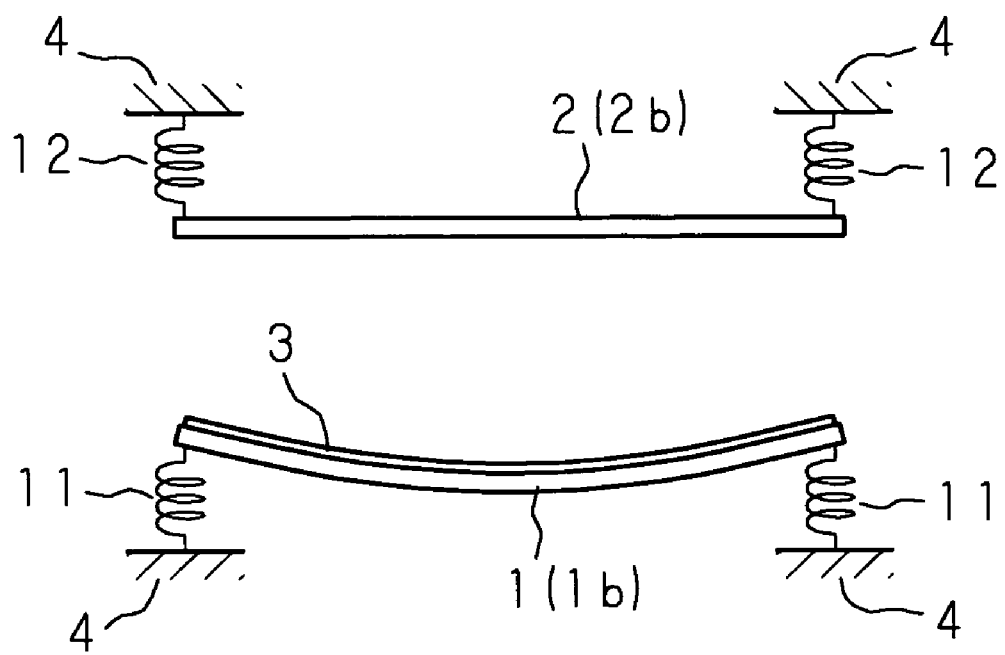
FIG. 5 is a structural diagram of the essential sections of a variable capacitor according to the second embodiment.

FIG. 5 is a structural diagram of the essential sections of a variable capacitor according to the second embodiment. In FIG. 5, the same parts as in FIGS. 4A–4C are designated with the same numbers. In the second embodiment shown in FIG. 5, the upper movable electrode 2 is flat, but the lower movable electrode 1 is deformed into a concave shape. In this example, the two electrodes 1 and 2 come into contact with each other at the periphery first, and then the contact area increases towards the center. The second embodiment also produces the same effect as in the first embodiment.

(Third Embodiment)

Figure 6:
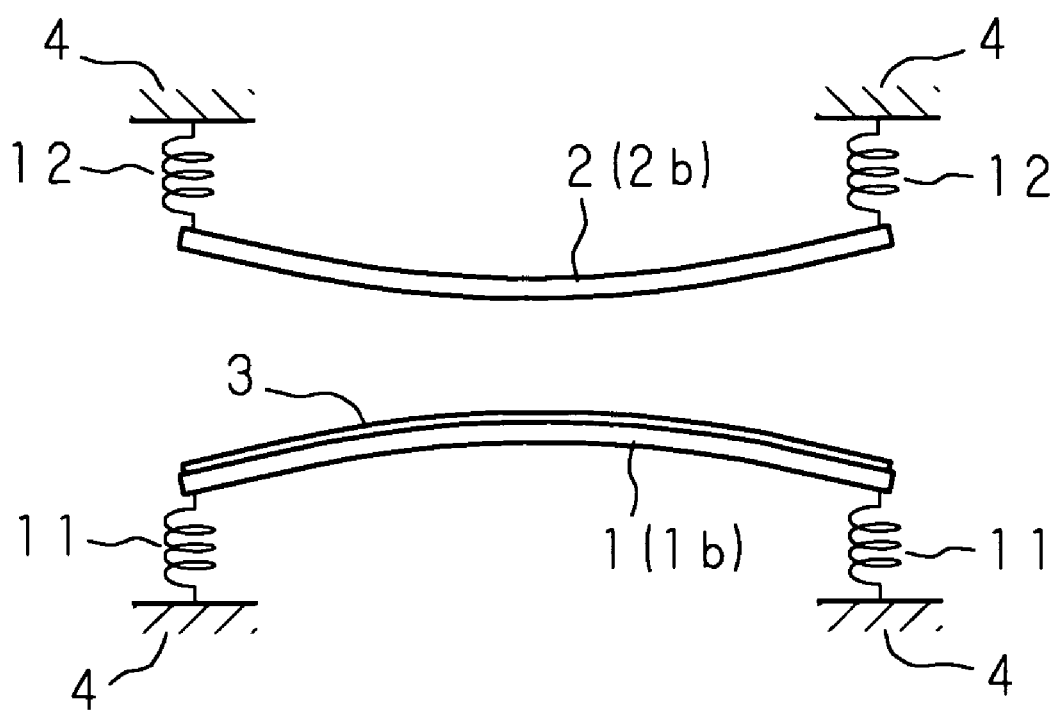
FIG. 6 is a structural diagram of the essential sections of a variable capacitor according to the third embodiment.

FIG. 6 is a structural diagram of the essential sections of a variable capacitor according to the third embodiment. In FIG. 6, the same parts as in FIGS. 4A–4C are designated with the same numbers. In the third embodiment shown in FIG. 6, both of the upper movable electrode 2 and lower movable electrode 1 are deformed into a convex shape. In this example, similarly to the first embodiment, the two electrodes 1 and 2 come into contact with each other at the center first, and then the contact area increases towards the periphery side. The third embodiment also produces the same effect as in the first embodiment.

(Fourth Embodiment)

Figure 7:
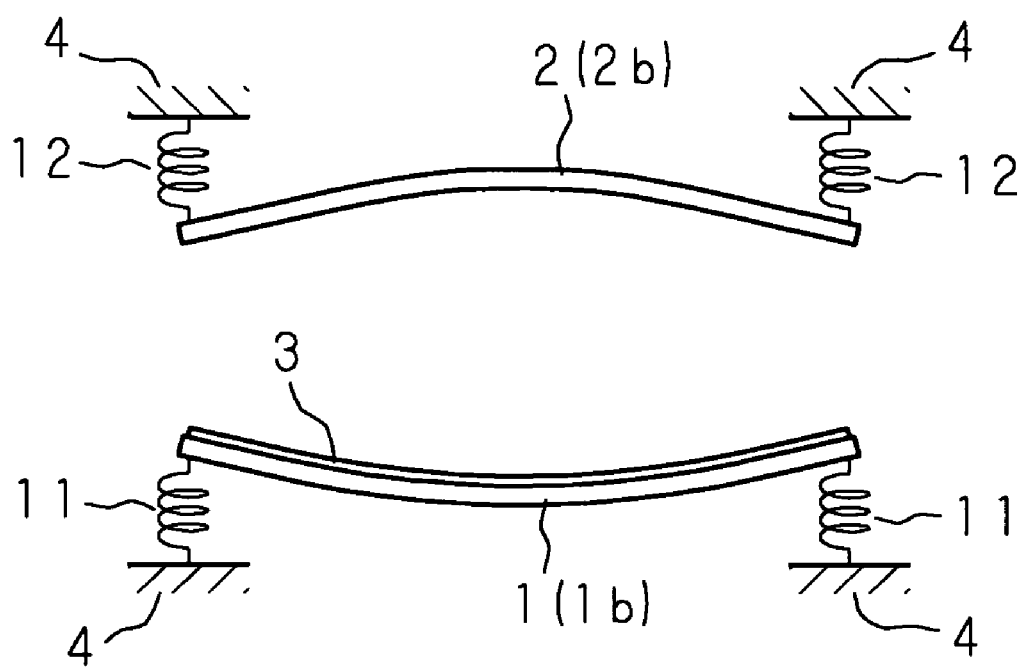
FIG. 7 is a structural diagram of the essential sections of a variable capacitor according to the fourth embodiment.

FIG. 7 is a structural diagram of the essential sections of a variable capacitor according to the fourth embodiment. In FIG. 7, the same parts as in FIGS. 4A–4C are designated with the same numbers. In the fourth embodiment shown in FIG. 7, both of the upper movable electrode 2 and the lower movable electrode 1 are deformed into a concave shape. In this example, similarly to the second embodiment, the two electrodes 1 and 2 come into contact with each other at the periphery first, and then the contact area increases towards the center. The fourth embodiment also produces the same effect as in the first embodiment.

(Fifth Embodiment)

Figure 8:
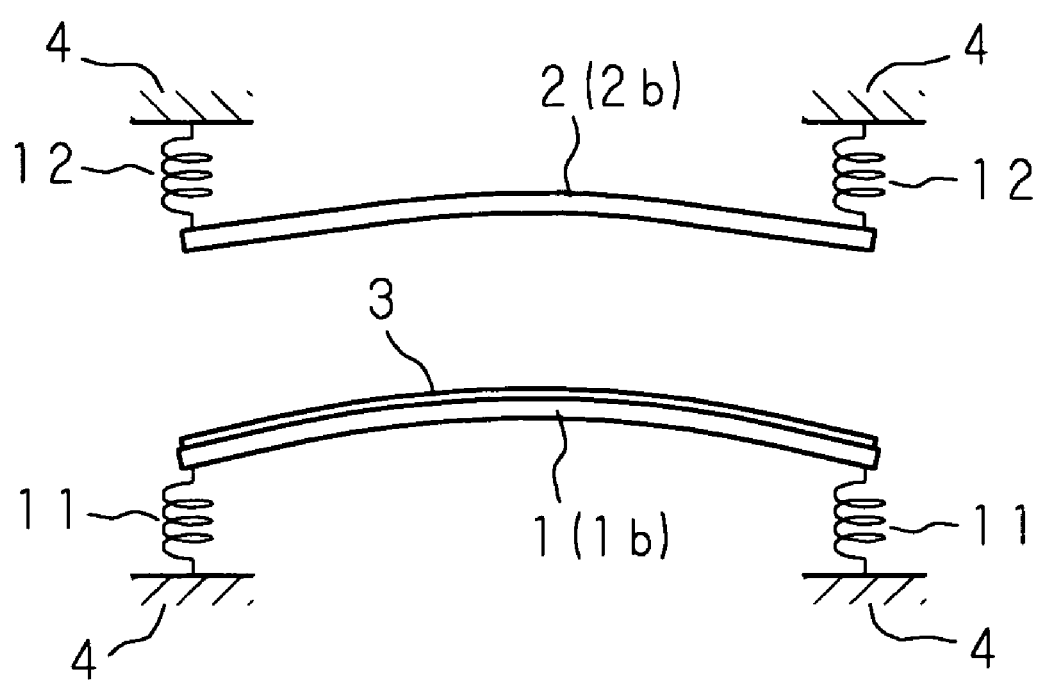
FIG. 8 is a structural diagram of the essential sections of a variable capacitor according to the fifth embodiment.

FIG. 8 is a structural diagram of the essential sections of a variable capacitor according to the fifth embodiment. In FIG. 8, the same parts as in FIGS. 4A–4C are designated with the same numbers. In the fifth embodiment shown in FIG. 8, the lower movable electrode 1 is deformed into a convex shape, and the upper movable electrode 2 is deformed into a concave shape. The fifth embodiment also produces the same effect as in the first embodiment. In the fifth embodiment, the convex shape of the movable electrode 1 and the concave shape of the movable electrode 2 are preferably different in shape, that is, the curvatures of them are preferably different from each other so as to prevent the two electrodes 1 and 2 from coming into contact with each other throughout the entire area at a time.

(Sixth Embodiment)

Figure 9:
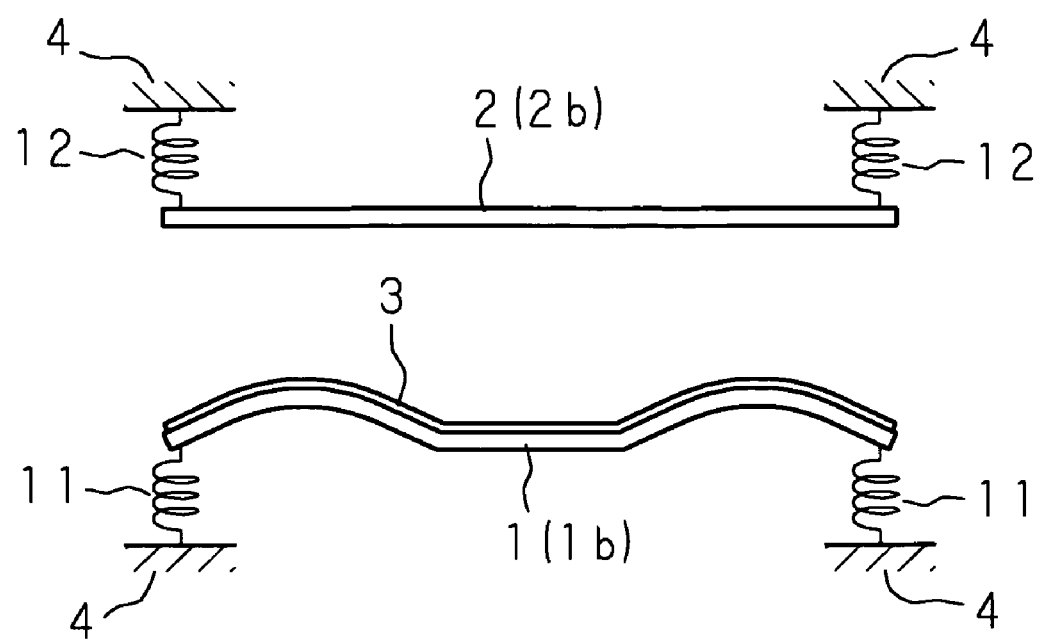
FIG. 9 is a structural diagram of the essential sections of a variable capacitor according to the sixth embodiment.

FIG. 9 is a structural diagram of the essential sections of a variable capacitor according to the sixth embodiment. In FIG. 9, the same parts as in FIGS. 4A–4C are designated with the same numbers. In the above-described first through fifth embodiments, the movable electrodes have a convex shape or a concave shape as a whole, whereas in the sixth embodiment shown in FIG. 9, the upper movable electrode 2 is entirely flat, but the lower movable electrode 1 is made of a flat electrode that is partly deformed into a convex shape. In this example, first, the two electrodes 1 and 2 come into contact with each other at the convex portion, and then the contact area increases towards the periphery side. The sixth embodiment also produces the same effect as in the first embodiment.

(Seventh Embodiment)

Figure 10:
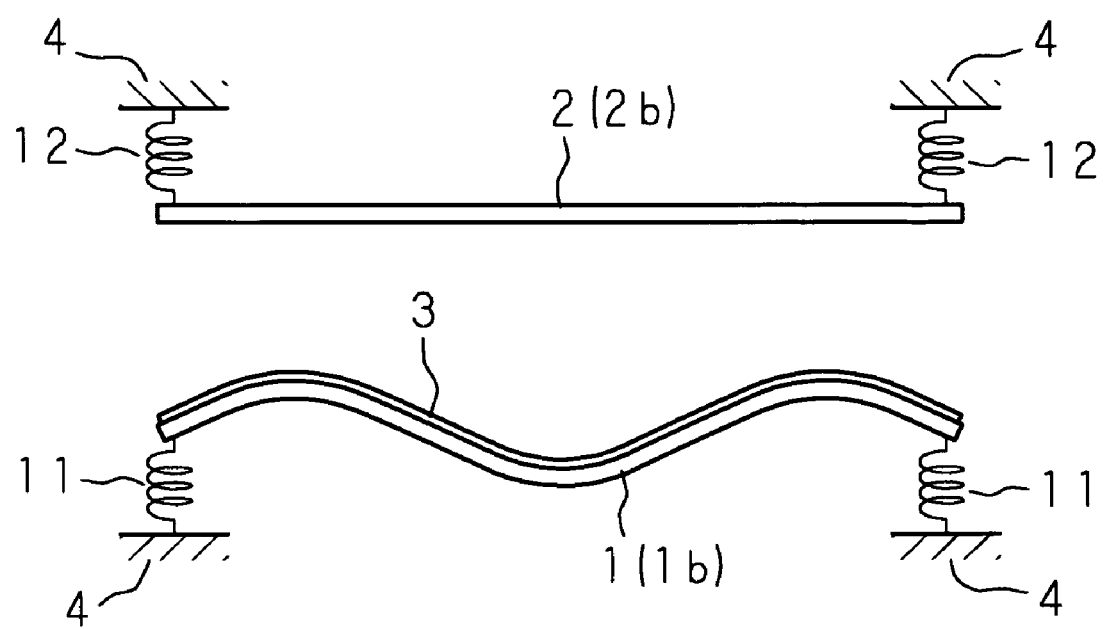
FIG. 10 is a structural diagram of the essential sections of a variable capacitor according to the seventh embodiment.

FIG. 10 is a structural diagram of the essential sections of a variable capacitor according to the seventh embodiment. In FIG. 10, the same parts as in FIGS. 4A–4C are designated with the same numbers. In the seventh embodiment shown in FIG. 10, the upper movable electrode 2 is entirely flat, but the lower movable electrode 1 is in a wavy shape having a convex portion and a concave portion alternately. In this example, first, the two electrodes 1 and 2 come into contact with each other at the convex portion, and then the contact area increases towards the periphery side. The seventh embodiment also produces the same effect as in the first embodiment.

The following description will explain a method of producing such a convex shape and a concave shape. If a movable electrode consists of a single layer, that is, if a dielectric layer is not placed on the surface, a convex shape or a concave shape can be produced by controlling the film deposition technique, annealing temperature, etc. in forming the electrode.

Figure 11:
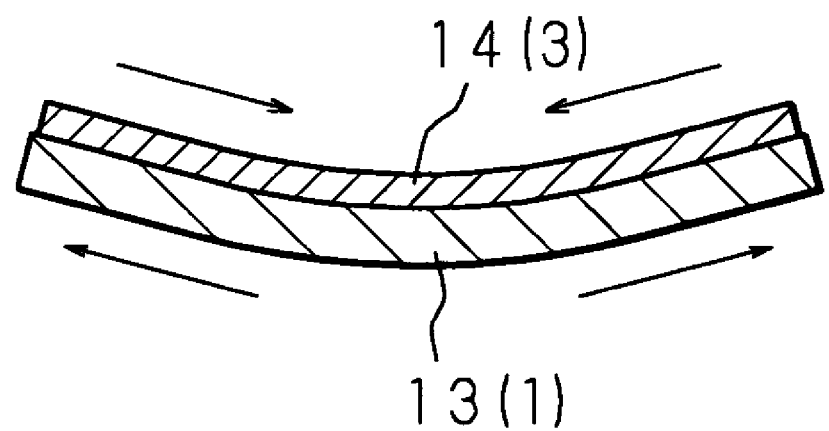
FIG. 11 is a cross sectional view showing a method of producing a movable electrode.

In the case of a movable electrode with a dielectric layer placed on the surface, it is possible to produce a convex shape or a concave shape by using the difference in the internal stress, or the difference in the thermal expansion coefficient between the materials to be used. For example, by using a material having a compressive stress as the material of the movable electrode 1 and using a material having a tensile stress as the material of the dielectric layer 3 to form an electrode film 13 and a dielectric film 14 of these materials as shown in FIG. 11, the structure with a concave center described in the second and fourth embodiments can be produced.

Figure 12:
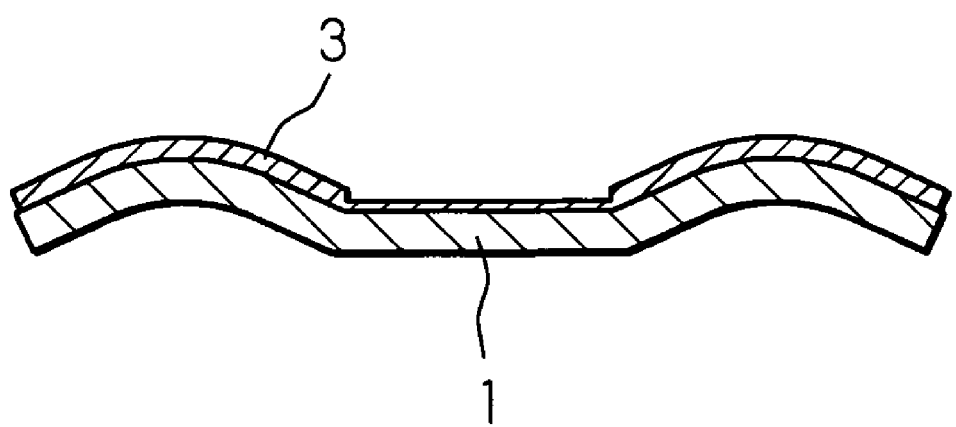
FIG. 12 is a cross sectional view showing a method of producing a movable electrode.

Besides, as shown in FIG. 12, it is also possible to produce a partly convex or concave shape by partly changing the film thickness of the movable electrode 1 and/or the dielectric layer 3.

Figure 13A:
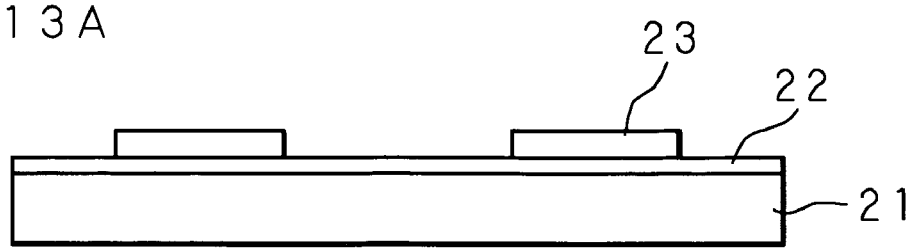
FIGS. 13A–13D are cross sectional views showing one example of the process of manufacturing a movable electrode.
Figure 13B:
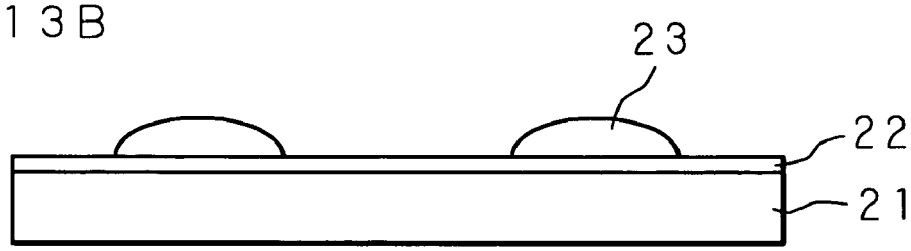
Figure 13C:
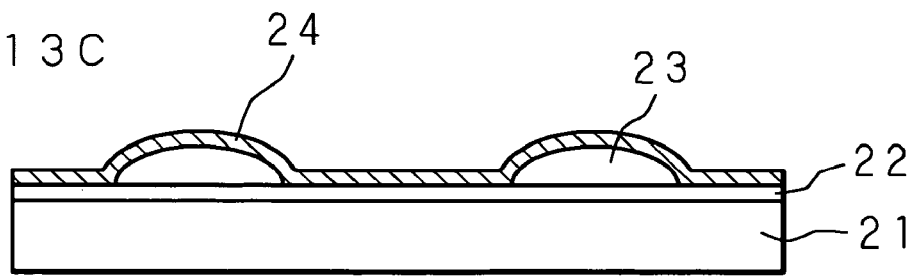
Figure 13D:
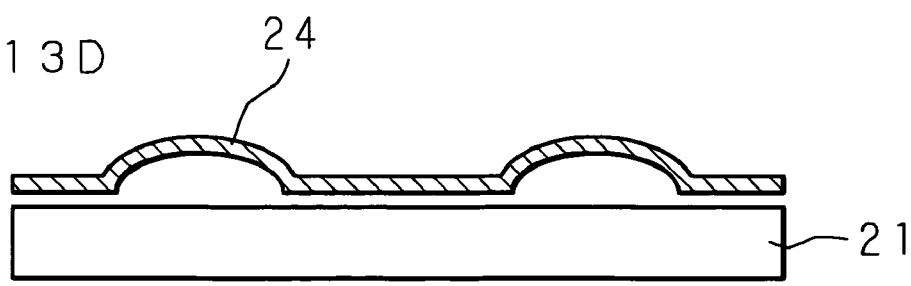

FIGS. 13A–13D are cross sectional views showing one example of the process of manufacturing a movable electrode. For example, a sacrifice layer 22 is formed on a substrate 21 made of silicon, for example, and a pattern of resist 23 is formed on the sacrifice layer 22 (FIG. 13A). After deforming the pattern of the resist 23 into a convex shape by heat treatment (FIG. 13B), an electrode film 24 made of aluminum, for example, is formed to cover the sacrifice layer 22 and the resist 23 (FIG. 13C). Finally, by removing the sacrifice layer 22 and the resist 23, a movable electrode having a partly convex shape is obtained (FIG. 13D).

(Eighth Embodiment)

Figure 14A:
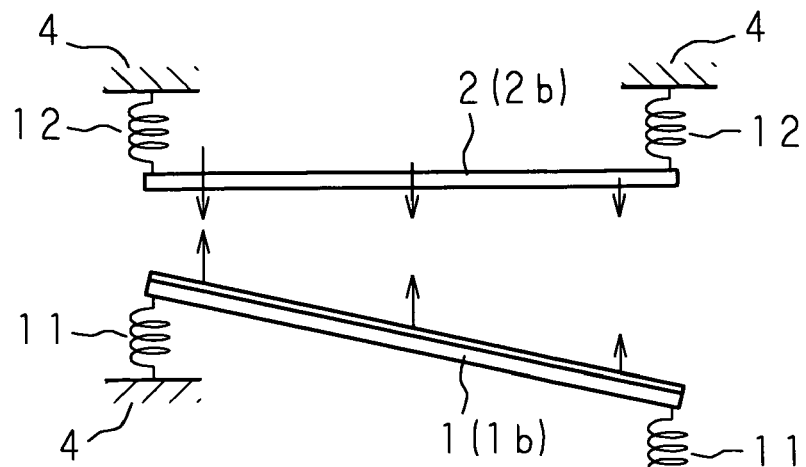
FIGS. 14A–14C are structural diagrams of the essential sections of a variable capacitor according to the eighth embodiment.
Figure 14B:
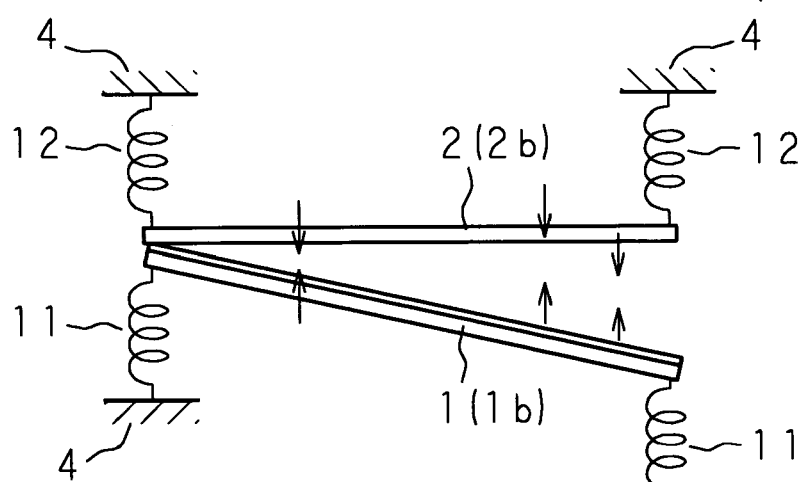
Figure 14C:
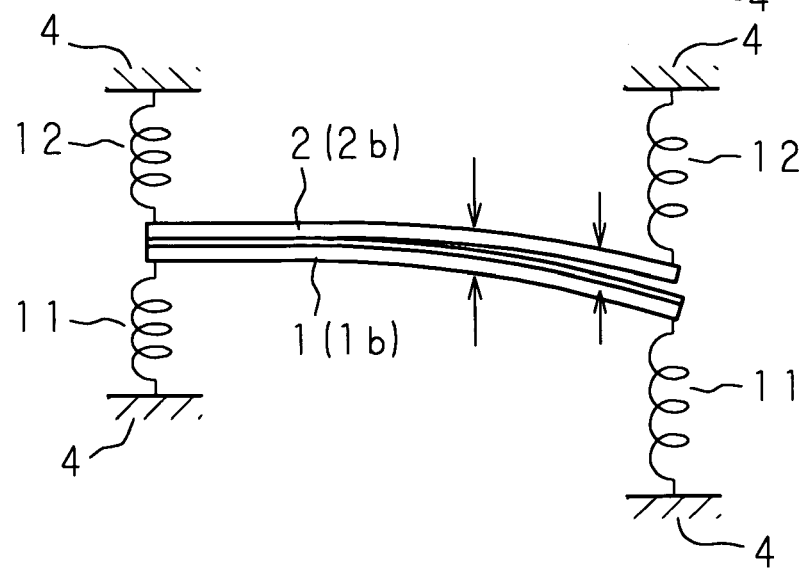

FIGS. 14A–14C are structural diagrams of the essential sections of a variable capacitor according to the eighth embodiment. In FIGS. 14A–14C, the same parts as in FIGS. 4A–4C are designated with the same numbers. Unlike the above-described first through seventh embodiments in which a convex shape or a concave shape is formed in the movable electrode 1 and/or the movable electrode 2, in the eighth embodiment, both of the movable electrode 1 and movable electrode 2 are plate electrodes.

As shown in FIG. 14A, the movable electrode 1 and movable electrode 2 are resiliently supported by the substrate 4 so that their capacitor sections 1b and 2b face each other. The movable electrode 1 and movable electrode 2 are not parallel, and the two electrodes 1 and 2 are arranged so that the movable electrode 1 is tilted with respect to the movable electrode 2.

When the distance between the movable electrode 1 and movable electrode 2 is shortened by applying a voltage between the two electrodes 1 and 2, first, a part of the movable electrode 1 and a part of the movable electrode 2 (the left end in FIG. 14B) come into contact with each other with the dielectric layer 3 therebetween because the movable electrode 1 is tilted with respect to the movable electrode 2. Then, the movable electrode 2 and the dielectric layer 3 (movable electrode 1) come into contact with each other successively from the contact part, and the contact area gradually increases (FIG. 14C). The eighth embodiment also produces the same effect as in the first embodiment.

Note that in each of the above-described embodiments, although the dielectric layer 3 is placed on the lower movable electrode 1, the dielectric layer 3 may be placed on the surface of the upper movable electrode 2 on the side facing the movable electrode 1. Alternatively, it may be possible to place the dielectric layer 3 on the facing surfaces of both of the movable electrode 1 and movable electrode 2. Note that in each of the above-described embodiments, although the dielectric layer 3 is placed on whole surface of the electrode 1 and/or 2, the dielectric layer 3 may be placed in a part of surface of the electrode 1 and/or 2. As a result, the shape of the dielectric layer 3 doesn't matter, so far as a short-circuit between electrodes 1 and 2 is prevented. Placing the dielectric layer 3 on the movable electrode 1 and/or the movable electrode 2 is not essential, and an arbitrary method may be used to place the dielectric layer 3 as long as the dielectric layer 3 is present between the movable electrode 1 and movable electrode 2 when the electrodes 1 and 2 come into contact with each other.

Although each of the above-described embodiments explains the cases where both of two facing electrodes are movable electrodes, the present invention is also applicable to the structure where one of the electrodes is a fixed electrode and the other is a movable electrode.

Besides, although the structure using an electrostatic actuator to change the distance between the two facing electrodes has been explained, it may of course be possible to use other driving means, such as a piezoelectric actuator, a thermal actuator, and an electromagnetic actuator.

Although each example explains a variable capacitor which utilizes both of the capacitance change before the two facing electrodes come into contact with each other and the capacitance change while the contact area increases from the contact part as the origin, the variable capacitor may utilize capacitance change only while the contact area increases.

In a variable capacitor of the present invention, when the distance between the two facing electrodes is shortened, parts of the two electrodes come into contact with each other with a dielectric layer therebetween, and the contact area gradually increases from the contact part as the origin. In this structure, a large capacitance and a large capacitance change can be obtained without being influenced by a pull-in phenomenon.

In a variable capacitor of the present invention, since one or both of two electrodes have a convex portion and/or a concave portion, it is possible to easily obtain a structure in which parts of the two electrodes come into contact with each other with a dielectric layer therebetween when shortening the distance between the two electrodes.

In a variable capacitor of the present invention, since one of the electrodes is tilted with respect to the other electrode, it is possible to easily obtain a structure in which parts of the two electrodes come into contact with each other with a dielectric layer therebetween when shortening the distance between the two electrodes.

In a variable capacitor of the present invention, since the dielectric layer to be interposed between the two facing electrodes is placed at least on the facing surface of one of the electrodes, the dielectric layer for preventing a short-circuit between the electrodes can be provided stably.

In a variable capacitor of the present invention, since hydrophobic treatment is applied to the facing surfaces of the two facing electrodes and/or the facing surface of the dielectric layer, it is possible to reduce occurrence of a sticking phenomenon between the two electrodes.

In a variable capacitor of the present invention, since the convex portion and/or the concave portion are used as springs when changing the distance between the two facing electrodes, it is possible to easily increase the contact from the convex portion and/or the concave portion as the origin.

In a variable capacitor of the present invention, since the convex portion and/or the concave portion of the two facing electrodes are formed using the difference in the internal stress or thermal expansion coefficient between the materials, the convex portion and/or the concave portion can be easily formed.

In a method of manufacturing a variable capacitor of the present invention, since an electrode film and a dielectric film having opposite stress directions are stacked, an electrode with a convex or concave center can be easily produced.

In a method of manufacturing a variable capacitor of the present invention, a sacrifice layer is formed on a substrate, a convex resist pattern is formed on the sacrifice layer, an electrode film is formed to cover the sacrifice layer and the resist pattern, and then the sacrifice layer and the resist pattern are removed. Accordingly, it is possible to easily produce an electrode having a partly convex shape.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A variable capacitor whose capacitance is changed by changing a distance between two facing movable electrodes, comprising
    a dielectric layer placed between the two movable electrodes,
    wherein when the distance between the two movable electrodes is shortened, parts of the two electrodes come into contact with each other with the dielectric layer therebetween, and a contact area increases from the contact part as an origin, and
    the convex portion and/or the concave portion are used as springs when changing the distance between the two electrodes.

2. The variable capacitor of claim 1, wherein the dielectric layer is placed on a facing surface of one or both of the two electrodes.

3. The variable capacitor of claim 1, wherein a hydrophobic treatment is applied to facing surfaces of the electrodes and/or a facing surface of the dielectric layer.

4. The variable capacitor of claim 1, wherein the distance between the two movable electrodes is controlled by an electrostatic attraction force.

5. A variable capacitor whose capacitance is changed by changing a distance between two facing movable electrodes, comprising
    a dielectric layer placed between the two movable movable electrodes,
    wherein one or both of the two movable electrodes has a convex portion and/or a concave portion, and
    the convex portion and/or the concave portion are used as springs when changing the distance between the two moveable electrodes.

6. The variable capacitor of claim 5, wherein the dielectric layer is placed on a facing surface of one or both of the two movable electrodes.

7. The variable capacitor of claim 5, wherein a hydrophobic treatment is applied to facing surfaces of the electrodes and/or a facing surface of the dielectric layer.

8. The variable capacitor of claim 5, wherein the distance between the two movable electrodes is controlled by an electrostatic attraction force.

9. A variable capacitor whose capacitance is changed by changing a distance between two facing movable electrodes, comprising
    a dielectric layer placed between two facing movable electrodes,
    wherein one or both of the two movable electrodes has a convex portion and/or a concave portion, and
    the convex portion and/or the concave portion are formed using a difference in internal stress or thermal expansion coefficient between materials.

10. The variable capacitor of claim 9, wherein the dielectric layer is placed on a facing surface of one or both of the two movable electrodes.

11. The variable capacitor of claim 9, wherein a hydrophobic treatment is applied to facing surfaces of the electrodes and/or a facing surface of the dielectric layer.

12. The variable capacitor of claim 9, wherein the distance vetween the two movable electrodes is controlled by an electrostatic attraction force.

13. A variable capacitor whose capacitance is changed by changing a distance between two facing movable electrodes, comprising a dielectric layer placed between the two movable electrodes, wherein one or both of the two movable electrodes has a convex portion and/or a concave portion, and wherein when the distance between the two movable electrodes is shortened, for forming a contact part initially parts of the two movable electrodes come into contact with each other, with the dielectric layer therebetween, and then the contact area increases progressively from the contact part as an origin.

* * * * *